(12) United States Patent
Chao et al.

(10) Patent No.: US 6,787,715 B2
(45) Date of Patent: Sep. 7, 2004

(54) N-SHAPED ANTENNA LOOPS OF DIGITIZER TABLET FOR REDUCING ANTENNA SWITCHES AND THE METHOD FOR LOCATING THE CORDLESS PEN

(75) Inventors: Ching-Chuan Chao, Taipei (TW); Chia-Jui Yeh, Taipei (TW)

(73) Assignee: AIPTEK International Inc., Hsin-Chu (TW)

( * ) Notice: Subject to any disclaimer, the term of this patent is extended or adjusted under 35 U.S.C. 154(b) by 296 days.

(21) Appl. No.: 10/025,914

(22) Filed: Dec. 26, 2001

(65) Prior Publication Data

US 2002/0053474 A1 May 9, 2002

Related U.S. Application Data

(63) Continuation-in-part of application No. 09/431,219, filed on Nov. 1, 1999.

(51) Int. Cl.[7] ............................................. G06K 11/06
(52) U.S. Cl. .................... 178/18.01; 178/19.01
(58) Field of Search ................................. 345/179, 173; 178/18.01, 18.02, 18.03, 18.04, 18.05, 18.06, 18.07, 19.03, 19.06

(56) References Cited

U.S. PATENT DOCUMENTS

| | | | |
|---|---|---|---|
| 4,835,347 A | 5/1989 | Watson | 178/18 |
| 4,948,926 A | * 8/1990 | Murakami et al. | 178/18.07 |
| 5,028,745 A | * 7/1991 | Yamanami et al. | 178/18.07 |
| 5,051,545 A | 9/1991 | McDermott | 178/18 |
| 5,134,253 A | * 7/1992 | Doubrava | 178/18.07 |
| 5,210,380 A | 5/1993 | McDermott et al. | 178/19 |
| 5,416,280 A | 5/1995 | McDermott et al. | 178/19 |
| 5,657,011 A | * 8/1997 | Komatsu et al. | 341/5 |
| 5,670,754 A | * 9/1997 | Matsushima | 178/18.07 |
| 5,682,019 A | * 10/1997 | Katsurahira et al. | 178/18.07 |
| 5,691,511 A | * 11/1997 | Matsushima et al. | 178/18.04 |
| 5,854,449 A | * 12/1998 | Adkins | 178/18.02 |
| 5,856,639 A | * 1/1999 | Landmeier | 178/18.01 |
| 6,005,555 A | * 12/1999 | Katsurahira et al. | 345/174 |
| 6,246,393 B1 | 6/2001 | Watanabe et al. | 345/173 |
| 6,297,811 B1 | * 10/2001 | Kent et al. | 345/173 |
| 6,476,799 B1 | * 11/2002 | Lee et al. | 345/174 |
| 6,606,087 B1 | * 8/2003 | Tomomatsu | 345/174 |

\* cited by examiner

*Primary Examiner*—Vijay Shankar
*Assistant Examiner*—Nitin Patel
(74) *Attorney, Agent, or Firm*—Bacon & Thomas, PLLC

(57) ABSTRACT

A digitizer tablet comprises a plurality of physical antenna loops distributed along the X- and Y-directions of two-dimensional Cartesian coordinates (X, Y) on the digitizer tablet, wherein each physical antenna loop comprises a plurality of logical sections. For the logical sections of each of the physical antenna loops distributed in the same direction, the adjacent logical sections of the logical sections belong to different physical antenna loops.

19 Claims, 4 Drawing Sheets

Loop Arrangement Table

| | Loop Arrangement Table | | | | | | | | | | | | | | | | | | | |
|---|---|---|---|---|---|---|---|---|---|---|---|---|---|---|---|---|---|---|---|---|
| Physical Antenna Loop | 1 | 2 | 3 | 4 | 5 | 6 | 7 | 8 | 9 | A | 1 | B | 3 | C | 5 | 2 | 7 | 4 | 9 | 6 |
| Logic Address | 1 | 2 | 3 | 4 | 5 | 6 | 7 | 8 | 9 | 10 | 11 | 12 | 13 | 14 | 15 | 16 | 17 | 18 | 19 | 20 |

| | Loop Arrangement Table | | | | | | | | | | | | | | | | | | | |
|---|---|---|---|---|---|---|---|---|---|---|---|---|---|---|---|---|---|---|---|---|
| Physical Antenna Loop | A | 8 | B | C | 1 | 3 | 5 | 7 | 9 | 2 | 4 | 6 | 8 | C | A | B | 5 | 1 | 7 | 3 | 9 |
| Logic Address | 21 | 22 | 23 | 24 | 25 | 26 | 27 | 28 | 29 | 30 | 31 | 32 | 33 | 34 | 35 | 36 | 37 | 38 | 39 | 40 | 41 |

FIG.3A

Adjacent Table

| Physical Antenna Loop | Adjacent Physical Antenna Loop |
|---|---|
| 1 | 2-A-B-C-3-5-7 |
| 2 | 1-3-5-7-9-4 |
| 3 | 2-4-B-C-1-5-7-9 |
| 4 | 3-5-7-9-2-6 |
| 5 | 4-6-C-2-3-7-B-1 |
| 6 | 5-7-9-A-4-8 |
| 7 | 6-8-2-4-5-9-1-3 |
| 8 | 7-9-A-B-6-C |
| 9 | 8-A-4-6-7-2-3 |
| A | 9-1-6-8-C-B |
| B | 1-3-8-C-A-5 |
| C | 3-5-B-1-8-A |

FIG.3B

ND-SHAPED ANTENNA LOOPS OF DIGITIZER TABLET FOR REDUCING ANTENNA SWITCHES AND THE METHOD FOR LOCATING THE CORDLESS PEN

BACKGROUND OF THE INVENTION

This application is a continuation-in-part of U.S. patent application Ser. No. 09/431,219, filed Nov. 1, 1999.

1. Field of the Invention

The present invention generally relates to a digitizer tablet and in particular to a digitizer tablet with n-shaped antenna loops for reducing antenna switches and a method for locating the cordless pen.

2. Description of the Prior Art

The present invention relates to a digitizer tablet which comprises a plurality of physical antenna loops distributed in the X- and Y-directions of two-dimensional Cartesian coordinates (X, Y) on the digitizer tablet, wherein at least one physical antenna loop comprises a plurality of logical sections.

A prior art digitizer tablet comprises a plurality of physical antenna loops spaced in predetermined intervals along the X- and Y-directions of two-dimensional Cartesian coordinates on the digitizer tablet. These physical antenna loops are configured in a grid-typed array to detect the electromagnetic field change induced by an electromagnetic pen. When an electromagnetic pen is getting close to an antenna loop of the digitizer tablet, the antenna loop can detect the electromagnetic field change induced by the electromagnetic pen and therefore produce an induction voltage. The induction voltage is inversely proportional to square of the distance between the electromagnetic pen and the antenna loop. When an electromagnetic pen moves right above one antenna loop, the induced voltage of this antenna loop is maximal and it becomes smaller to those antenna loops located farther from the electromagnetic pen. Therefore, the position of the electromagnetic pen can be decided by utilizing the experimental relation among the induction voltage, the position of the electromagnetic pen and the antenna loops.

FIG. 1 shows the prior art of a digitizer tablet with a plurality of physical antenna loops 10 distributed in the X-direction of two-dimensional Cartesian coordinates, wherein one terminal of each of the antenna loops 10 is connected to a switch 11 and the other terminal is electrically grounded. Nowadays, digitizer tablets with bigger areas are commercially required, therefore, the amount of switches and antenna loops in the digitizer tablets prior art is increased accordingly.

One of the disadvantages in the prior art of a digitizer tablet is the increasing cost caused by the increasing amount of switches. Another disadvantage is the increasing dimension of the digitizer tablet in order to contain more switches. However, the dimension increase of the digitizer tablet certainly results in higher material cost. Yet another disadvantage is the increasing amount of ICs in a circuit board caused by the increasing amount of switches, thus, it surely results in a lower production yield and indirectly causes the increase of production cost.

In accordance with the above description, a digitizer tablet with a plurality of logical sections in each physical antenna loop is therefore necessary in order to prevent the above-mentioned disadvantages, so as to reduce the amount of antenna loops and switches therein. After experimentation, it is proven, the expected effect can be achieved by using the digitizer tablet in accordance with the present invention.

SUMMARY OF THE INVENTION

In accordance with the present invention, a new digitizer tablet with a plurality of logical sections in each physical antenna loop is provided that substantially overcomes drawbacks of the above mentioned problems in the conventional system, so as to increase and improve efficiency of conventional digitizer tablets.

Accordingly, it is an object of the present invention to provide a new digitizer tablet with a plurality of physical antenna loops, wherein at least one physical antenna loop comprises a plurality of logical sections. By utilizing the plurality of logical sections of each physical antenna loop to decide the position of an electromagnetic pen, the amount of necessary physical antenna loops and switches in a digitizer tablet can be reduced in order to reduce the material cost. In addition, the production yield can also be improved. Furthermore, the present invention utilizes a method for arranging the antenna loops by a design table to locate where the pen is, wherein the design table is combined with a central processing unit (CPU) to arrange the antenna loops, whereby the present invention can reduce time and amount of antenna switches for determining the position of the pen. Therefore, this invention corresponds to economic effect and utilization in industry.

In accordance with the present invention, a new digitizer tablet having a plurality of physical antenna loops and the method for forming the same is provided in order to achieve the above-mentioned and other objects. In this invention, the digitizer tablet comprising a plurality of physical antenna loops distributed along the X- and Y-directions of two-dimensional Cartesian coordinates (X, Y), wherein each physical antenna loop comprises a plurality of logical sections. For each of the physical antenna loops distributed in the same direction, the adjacent logical sections of each logical section therein belongs to different physical antenna loops. Moreover, the arrangement of the antenna loops is distributed by a design table in the central processing unit (CPU), so as to detect a first signal with the largest voltage, a second signal with the secondary voltage and a third signal with the tertiary voltage in order whereby the position of the pen can be determined without additional antenna loops and the switches thereof.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 schematically shows a loop arrangement table of the digitizer tablet in accordance with an embodiment of the present invention.

DESCRIPTION OF THE PREFERRED EMBODIMENT

Preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
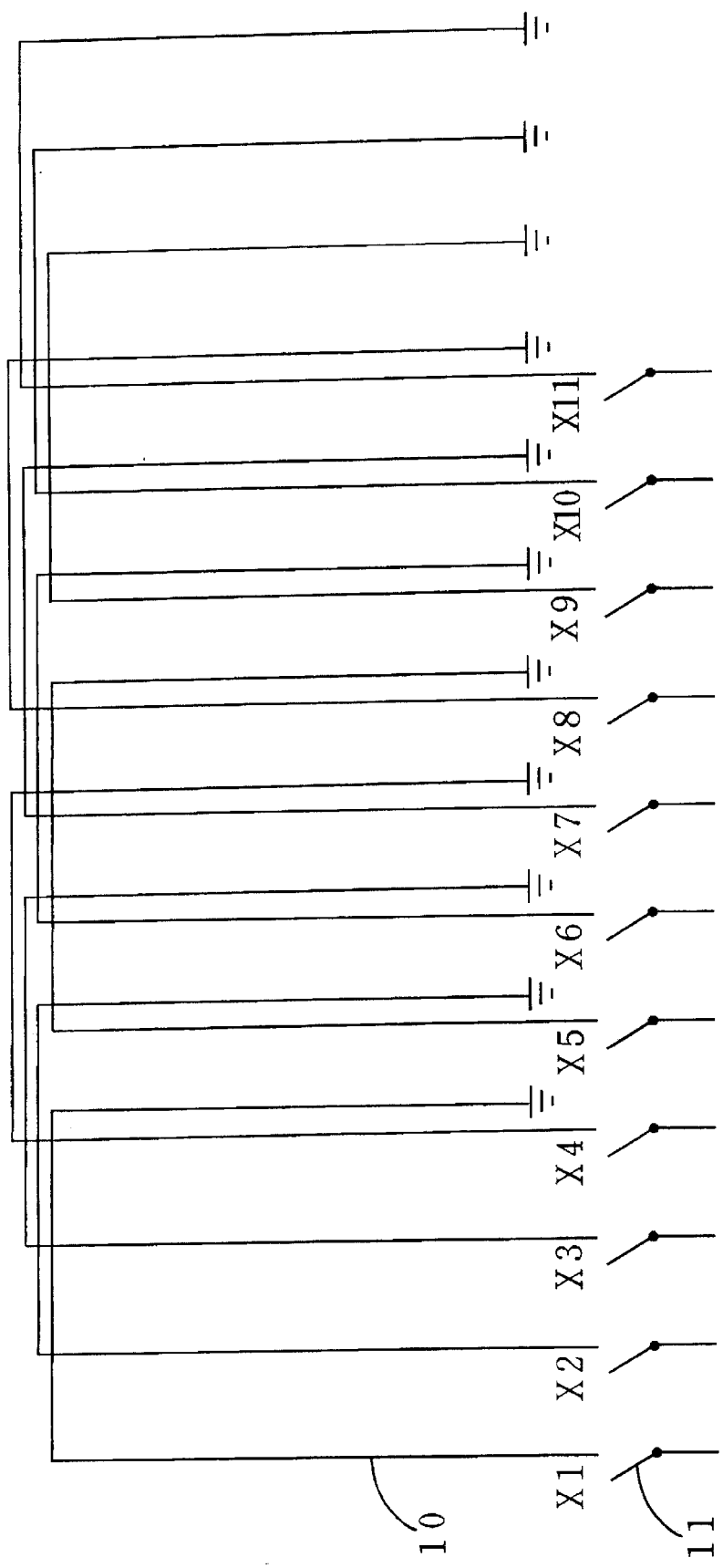
FIG. 1 schematically shows a prior art digitizer tablet with a plurality of physical antenna loops distributed in the X- and Y-directions of two-dimensional Cartesian coordinates (X, Y)
Figure 2:
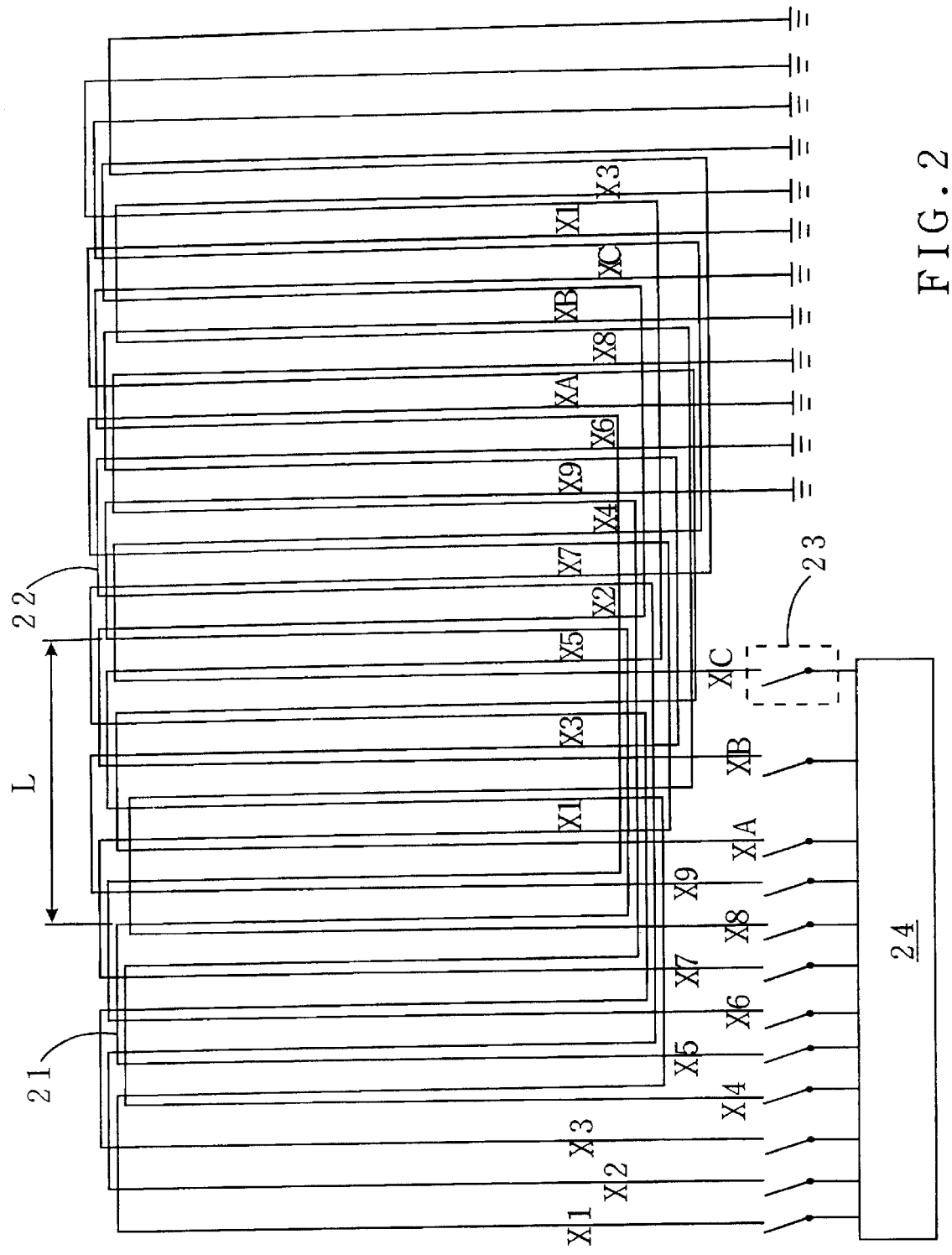
FIG. 2 schematically shows an embodiment of the digitizer tablet in accordance with the present invention, wherein a plurality of physical antenna loops are distributed in the X-direction of two-dimensional Cartesian coordinates.

As illustrated in FIG. 2, in an embodiment of the present invention, the digitizer tablet in accordance with the present invention comprises 12 physical antenna loops (X1 to X9, and XA to XC) along the X-direction of two-dimensional Cartesian coordinates, wherein one terminal of each antenna loop is electrically connected to a switch and the other terminal is electrically grounded. Each physical antenna loop contains a plurality of substantially n-shaped logical sections.

Referring to FIG. 2, this embodiment is characterized in that: for each of the physical antenna loops distributed in different locations of the digitizer tablet, the adjacent logical sections of each logical section therein belongs to different physical antenna loops. For example, for the n-shaped logical section (denoted by number 21) of the physical antenna loop X5, its adjacent n-shaped logical sections belong to the physical antenna loop X4 and X6 respectively. However, for the next logical section of the physical antenna loop X5, i.e. the n-shaped logical section denoted by number 22, its adjacent n-shaped logical sections belong to the physical antenna loop XC and X2 respectively. In carrying out the present invention, it is necessary to be noticed that the distance between two adjacent logical sections in the same physical antenna loop (e.g. the distance L between the adjacent logical sections of the physical antenna loop X5 noted by number 21 and 22) must be adequate. If the distance is too small, it is possible to make a mis-judgment in deciding the position of the electromagnetic pen. Thus, the position of the electromagnetic pen can be decided by the induction voltage produced by physical antenna loops X5, X4, X6, XC and X2 whether the electromagnetic pen (not shown) moves above the n-shaped logical section denoted by number 21 of the physical antenna loop X5, or above the n-shaped logical section denoted by number 22 of the physical antenna loop X5.

Referring to FIGS. 3A and 3B, in this embodiment of the present invention, the foregoing arrangement of the antenna loops is shown as a loop arrangement table provided in FIG. 3A, wherein the loop arrangement table is designed within a central processing unit (CPU), and an adjacent table that indicates the relationship between the logic sections of various physical antenna loops from each other is shown as the table provided in FIG. 3B, every one of the physical antenna loops has a logic address. The physical antenna loops in the same logical section can not be reduplicated; and further, each physical antenna loop is individually disposed at the first position of each line in the adjacent table, wherein each line in the adjacent table comprises three physical antenna loops with three logic address that are different from each other. On the other wards, amount of the logic addresses depend on the amount of the physical antenna loops.

Referring to FIGS. 2, 3A and 3B, in this embodiment of the present invention, all antenna switches 23 of physical antenna loops (X1 to XC) are coupled with the central processing unit (CPU) 24, wherein the central processing unit (CPU) 24 can locate the cordless pen by the loop arrangement table thereof. The method for detecting the cordless pen is described as following: first of all, the central processing unit (CPU) 24 turn on each antenna switch 23 of physical antenna loops in order, so as to detect a first signal with the largest voltage, a second signal with the secondary voltage and a third signal with the tertiary voltage, wherein the first signal, the second signal and the third signal can be induced themselves when the cordless pen is located on the digitizer tablet; then the first signal, the second signal and the third signal are transmitted back to the central processing unit (CPU) 24; afterward, the central processing unit (CPU) 24 can determine the logic address where the cordless pen is located on the digitizer tablet according to the loop arrangement table. For example, when the first signal with the largest voltage is induced at one of the logic sections of the physical antenna loop X5, the second signal with the secondary voltage is induced at one of logic sections of the physical antenna loop X4, and the third signal with the tertiary voltage is induced at one of the logic sections of the physical antenna loop X6, the central processing unit (CPU) 24 can receive these signals and determine the logic address 5 according to the loop arrangement table so as to find the position of the cordless pen.

The embodiment of the digitizer tablet in accordance with the present invention can be used in the same way as described in the foregoing paragraphs to distribute a plurality of physical antenna loops in the Y-direction of two-dimensional Cartesian coordinates. From the description above, it can be easily understood by those skilled in the art that for a digitizer tablet of a predetermined size and resolution, the amount of physical antenna loops and necessary switches therein can be reduced according to the present invention, so the above-mentioned objects can be achieved. Moreover, in deciding the position of the electromagnetic-pen on the digitizer tablet, the switches respectively connected to each antenna loop in the X- and Y-directions needs to be switched on one by one. The digitizer tablet in the prior art includes more switches, so the micro-controllers of the digitizer tablet needs to take a longer time to connect or disconnect each switch. Therefore, it usually causes delays. The digitizer tablet in accordance with the preferred embodiment of the invention can reduce the amount of switches and can also avoid the delay problem in the prior art digitizer tablet.

In the embodiment of the present invention, the present invention combines with a plurality of physical antenna loops to form a physical antenna loop with a plurality of logic sections whose profile is n-shape. Furthermore, this invention also utilizes a loop arrangement table to distribute the physical antenna loops, so as to detect the position of the cordless pen. In the conventional structure, for locating the cordless pen, the physical antenna loops have to be sequentially turned on so as to detect the voltage signal. On the contrary, in the present invention, a physical antenna loop with a plurality of n-shaped logic sections is about equal to a series connection of a plurality of physical antenna loops so as to reduce the antenna switches and costs thereof; and further, the voltage signal can be detected by switching the logic sections of the physical antenna loops to reduce the searching time for the position where the cordless pen is. Accordingly, this invention corresponds to economic effect and utilization in industry.

Of course, it is possible to apply the present invention for the digital tablet, and to any digital devices with the physical antenna loops having n-shaped logic sections. Also, the present invention that combines with a plurality of physical antenna loops to form a physical antenna loop with a plurality of n-shaped logic sections has not been developed at present.

Obviously, many modifications and variations of the present invention are possible in light of the above teachings. It is therefore to be understood that within the scope of the appended claims, the present invention may be practiced otherwise than as specifically described herein.

Although specific embodiments have been illustrated and described, it will be obvious to those skilled in the art that various modifications may be made without departing from what is intended to be limited solely by the appended claims.

What is claimed is:

1. An antenna loop arrangement for a digitizer tablet, comprising:
   a plurality of antenna loops distributed in the digitizer tablet, said plurality of antenna loops separated from each other by a first predetermined distance, wherein each said antenna loop has a first terminal and a second terminal, and a sequence for any one said antenna loop is different from sequences for two said antenna loops adjacent to said any one said antenna; and
   a plurality of n-shaped logical sections for each said antenna loop, wherein second distances between any adjacent two of said n-shaped logical sections within one said antenna loop are different, and wherein said plurality of n-shaped logical sections and the adjacent n-shaped logical sections thereof belong to different antenna loops from each other.

2. The antenna loop arrangement for a digitizer tablet according to claim 1, wherein said first terminal of each of said plurality of antenna loops is coupled with one of a plurality of switches.

3. The antenna loop arrangement for digitizer tablet according to claim 2, wherein said plurality of switches are coupled with a central processing unit of the digitizer tablet.

4. The antenna loop arrangement for a digitizer tablet according to claim 1, wherein said second terminal of each of said plurality of antenna loop is electrically grounded.

5. An antenna loop arrangement for a digitizer tablet, comprising:
   a plurality of physical antenna loops distributed in the digitizer tablet, said plurality of physical antenna loops separated from each other by a predetermined distance, wherein each said physical antenna loop has a first terminal and a second terminal, and a sequence for any one said antenna loop is different from sequences for two said antenna loops adjacent to said any one said antenna;
   a plurality of n-shaped logical sections for each said antenna loop, wherein second distances between any adjacent two of said n-shaped logical sections within one said antenna loop are different, and wherein said plurality of n-shaped logical sections and the adjacent n-shaped logical sections thereof belong to different physical antenna loops from each other;
   a plurality of antenna switches, each antenna switch coupled with said first terminal of said antenna loop, wherein said plurality of antenna switches are coupled with a central processing unit in the digitizer tablet; and
   a loop arrangement table in said central processing unit, wherein the distribution of said plurality of physical antenna loops are arranged in accordance with said loop arrangement table.

6. The antenna loop arrangement for a digitizer tablet according to claim 5, wherein said plurality of physical antenna loops are distributed along the X-direction of two-dimensional Cartesian coordinates (X, Y) on the digitizer tablet.

7. The antenna loop arrangement for a digitizer tablet according to claim 5, wherein said plurality of physical antenna loops are distributed along the Y-direction of two-dimensional Cartesian coordinates (X, Y) on the digitizer tablet.

8. The antenna loop arrangement for a digitizer tablet according to claim 5, wherein said second terminal of each of said plurality of physical antenna loops is electrically grounded.

9. A method of arranging antenna loops of a digitizer tablet to reduce a number of antenna switches, comprising the steps of:
   providing a loop arrangement table in a central processing unit of the digitizer tablet;
   distributing a plurality of physical antenna loops in the digitizer tablet and separating said plurality of physical antenna loops with a predetermined distance from each other according to said loop arrangement table wherein said loop arrangement table comprises a table of adjacent physical antenna loops which individually disposes each physical antenna loop at the first position of each logic address, and said plurality of physical antenna loops at the first positions of said plurality of logic addresses are different from each other;
   forming a plurality of logical sections in at least one physical antenna loop and forming at least one logical section in said each antenna loop, wherein said plurality of logical sections and the adjacent logical sections thereof belong to different physical antenna loops from each other;
   coupling each said physical antenna loop with an antenna switch; and
   coupling said plurality of antenna switches with said central processing unit to control switching of said plurality of physical antenna loops and said plurality of logical sections thereof.

10. The method of arranging antenna loops of a digitizer tablet to reduce a number of antenna switches according to claim 9, wherein said loop arrangement table comprises a plurality of logic addresses.

11. The method of arranging antenna loops of a digitizer tablet to reduce a number of antenna switches according to claim 10, wherein said plurality of logic addresses are the positions of said plurality of physical antenna loops.

12. The arrangement method of arranging antenna loops of a digitizer tablet to reduce a number of antenna switches according to claim 10, wherein the amount of said plurality of logic addresses depends on an amount of the physical antenna loops.

13. The method of arranging antenna loops of a digitizer tablet to reduce a number of antenna switches according to claim 9, wherein said plurality of logical sections are n-shaped regions of said plurality of physical antenna loops.

14. A method of locating cordless pen on a digitizer tablet, comprising:
   providing a plurality of physical antenna loops that have a plurality of n-shaped logical sections thereof, wherein said plurality of physical antenna loops are distributed in the digitizer tablet according to a loop arrangement table with a plurality of logic addresses in a central processing unit of the digitizer tablet, wherein said loop arrangement table comprises a table of adjacent physical antenna loops which individually disposes each physical antenna loop at a first position of each logic address, and said plurality of physical antenna loops at the first positions of said plurality of logic addresses are different from each other;
   causing said central processing unit to turn on a plurality of antenna switches of said plurality of physical antenna loops in order to detect a plurality of signals induced by the cordless pen;

transmitting said plurality of signals to said central processing unit to determine a first signal, a second signal and a third signal; and locating the position of the cordless pen by a first signal, a second signal and a third signal according to said loop arrangement table of said central processing unit.

15. The method for locating a cordless pen on a digitizer tablet according to claim 14, wherein said loop arrangement table is arranged by:

distributing said plurality of physical antenna loops in the digitizer tablet and separating said plurality of physical antenna loops with a predetermined distance from each other according to said loop arrangement table with said plurality of logic addresses;

forming said plurality of n-shaped logical sections in at least one physical antenna loop and forming at least one n-shaped logical section in each said antenna loop wherein said plurality of n-shaped logical sections and the adjacent n-shaped logical sections thereof belong to different physical antenna loops from each other;

coupling said each physical antenna loop with said antenna switch; and coupling said plurality of antenna switches with said central processing unit to control switching of said plurality of physical antenna loops and said plurality of logical sections thereof.

16. The method for locating the a cordless pen on a digitizer tablet according to claim 15, wherein the amount of said plurality of logic addresses depends on an amount of the physical antenna loops.

17. The method for locating a cordless pen on a digitizer tablet according to claim 14, wherein said first signal is a signal with a largest voltage.

18. The method for locating a cordless pen on a digitizer tablet according to claim 14, wherein said second signal is a signal with a secondary voltage.

19. The method for locating a cordless pen on a digitizer tablet according to claim 14, wherein said third signal is a signal with a tertiary voltage.

* * * * *